Figure 1:
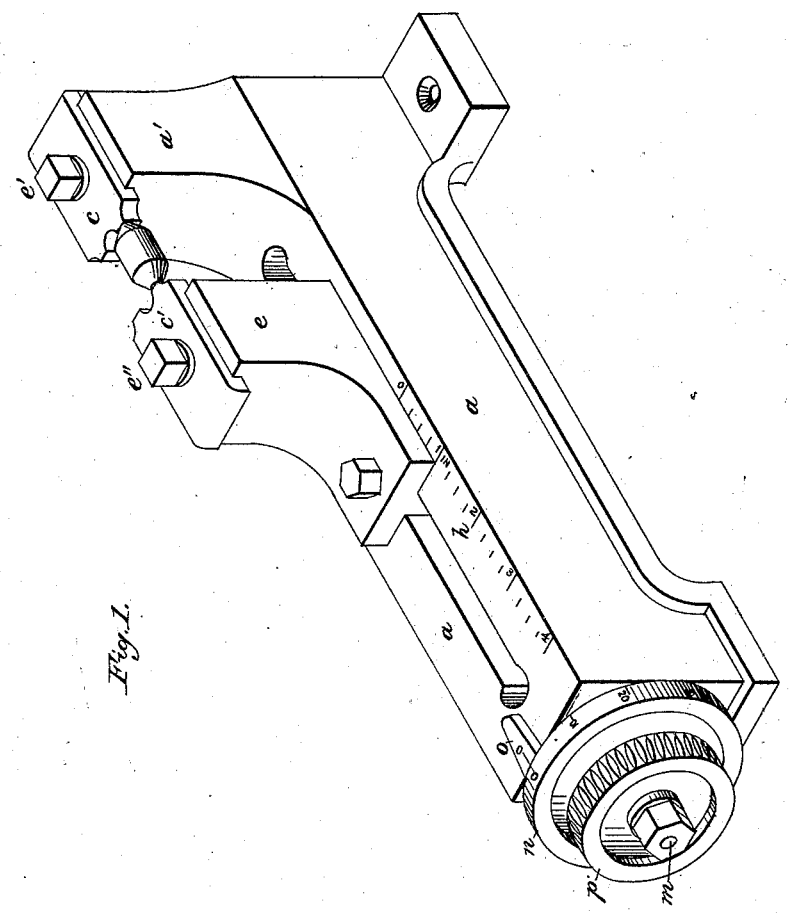

2 Sheets—Sheet 1

J. RICHARDS.
Micrometer-Gage.

No. 219,307. Patented Sept. 2, 1879.

Attest:
F. H. Schott.
D. P. Cowl

Inventor:
John Richards
 per J. C. Tasker & Co.
    attys

N. PETERS, PHOTO-LITHOGRAPHER, WASHINGTON, D. C.

2 Sheets—Sheet 2.
J. RICHARDS.
Micrometer-Gage.
No. 219,307. Patented Sept. 2, 1879.
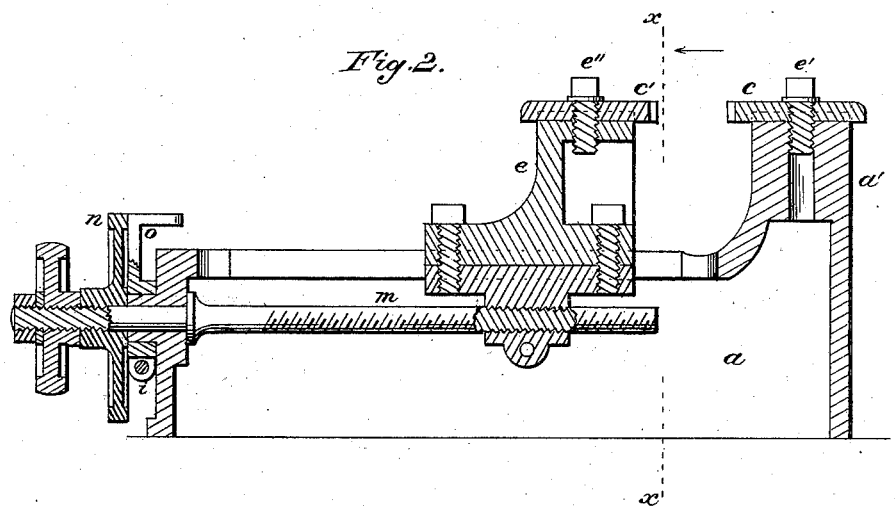
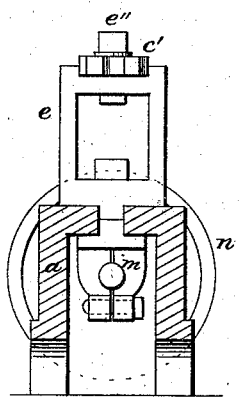
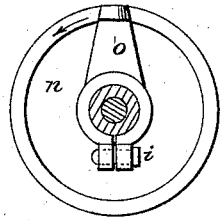
Attest:
F. H. Schott.
D. P. Cowl.
Inventor:
John Richards
by J. E. Tasker & Co.
attys

UNITED STATES PATENT OFFICE.

JOHN RICHARDS, OF PHILADELPHIA, PENNSYLVANIA.

IMPROVEMENT IN MICROMETER-GAGES.

Specification forming part of Letters Patent No. 219,307, dated September 2, 1879; application filed April 9, 1879.

*To all whom it may concern:*

Be it known that I, JOHN RICHARDS, of Philadelphia, in the county of Philadelphia and State of Pennsylvania, have invented certain new and useful Improvements in Measuring-Instruments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and improved means for determining and maintaining standard dimensions in machine-fitting or other cases where exact sizes are required, being an improvement on what are known as "standard" or "fixed" gaging implements; and it consists in a measuring or calipering machine constructed with contact points or surfaces which are advanced or retracted by means of an accurate screw, the revolutions and movements of which are indicated by a micrometer index-wheel attached to the screw, on the periphery of which are marked the divisions of standard measure, so as to be read to one-thousandth part of an inch, or less, all as hereinafter described.

It consists, also, in providing such instruments with a movable index, so that readings may commence from some whole number on the scale marked upon the frame; and in certain other details of construction, which will be fully described, and then specifically claimed.

In the accompanying drawings, Figure 1 is a perspective view of the machine complete. Fig. 2 is a vertical longitudinal section, showing the construction and relative arrangement of the different parts. Fig. 3 is a transverse section on the line $x\ x$ of Fig. 2; and Fig. 4 is a detail view, showing the method of attaching the index to the screw-spindle.

The machine consists of a strong inflexible frame, $a$, on one end of which, upon the elevated portion $a'$, is mounted the contact-point $c$, being secured to the part $a'$ by the set-screw $e'$. Sliding on the top of this frame $a$ is the movable head $e$, on which is fixed the other contact-point, $c'$, secured to the movable head by set-screw $e''$. This sliding head $e$ is moved by an accurately-formed screw, $m$, on one end of which is fixed a micrometer-wheel, $n$, the periphery of which wheel is marked with divisions corresponding, generally, to thousandths of an inch between the points $c$ and $c'$.

Upon the boss of the frame through which the spindle of the screw $m$ passes, beside the micrometer-wheel $n$, is placed a movable index or pointer, $o$, which can be moved forward or back, so as to indicate the starting-point on the scale $h$ and the distance traveled over on the latter by the movable head $a'$ in its forward reciprocation, it being rendered adjustable by means of a screw, $i$, that acts upon its slotted lower end, causing it to pinch the screw-spindle. This index can also be employed to record known changes in the screw or machine due to temperature; also to correct known deviation of the screw from a true standard pitch.

The screw $m$, in combination with the micrometer-wheel $n$, can be so arranged as to indicate decimal divisions of inches and fractions thereof, as may be most convenient.

A milled-edged hand-wheel, $p$, is secured to the extreme outer end of the screw-spindle, and furnishes a means of rotating the latter when the positions of the contact-points $c$ and $c'$ are to be changed with relation to each other.

I am well aware that measuring-machines have been constructed in this and other countries for use in preparing gaging or measuring implements, and not adapted, as in the present case, for practical use in workshops. Besides, such machines have been generally made with two movable points—one having a short range, governed by some exact mechanism, and the other a sliding or adjustable point, which could be set for various lengths after some other standard had been provided. My machine differs from this in so far that its whole range is for measuring independent of all test-rods or other standards, the accuracy dependent alone upon the truth of the screw and its temperature, the machine being so arranged that from it can be made tools and gaging implements of all kinds as they may be required, their dimensions being more true than if copied from other implements, the system being not only more simple but much less expensive than those hitherto practiced in workshops for accomplishing the same result.

Having thus described my invention, I claim as new, and desire to secure by Letters Patent, the following:

1. In a measuring and calipering machine, the combination of the fixed and movable heads $a'$ $e$, slides $c$ $c'$, an adjusting-screw, $m$, the adjustable pointer $o$ and fixed index $h$, and a micrometer-wheel, substantially as described, and for the purpose set forth.

2. The index or pointer $o$, adjustably secured to a boss on the frame by means of its slotted end and the screw-bolt $i$, substantially as and for the purpose specified.

In testimony that I claim the foregoing I have hereunto set my hand this 9th day of April, 1879.

JOHN RICHARDS.

Witnesses:
E. A. DICK,
J. C. TASKER.